United States Patent

[11] 3,552,286

| [72] | Inventors | William H. Horton<br>Rush;<br>Allan M. Palmer, Rochester, N.Y. |
|---|---|---|
| [21] | Appl. No. | 726,954 |
| [22] | Filed | May 6, 1968 |
| [45] | Patented | Jan. 5, 1971 |
| [73] | Assignee | Eastman Kodak Company<br>Rochester, N.Y.<br>a corporation of New Jersey |

[54] FLASH CAMERA
7 Claims, 8 Drawing Figs.

[52] U.S. Cl. .................................................. 95/11,
240/37.1
[51] Int. Cl. ........................................ G03b 19/02
[50] Field of Search ........................................... 95/11,
11Lamp, 11.5; 240/1.3, 37, 37.1

[56] References Cited
UNITED STATES PATENTS

| 3,353,467 | 11/1967 | Ernisse et al. ................. | 95/11.5 |
| 3,369,468 | 2/1968 | Sapp et al. .................... | 95/11.5 |
| 3,443,497 | 5/1969 | Bihlmaier ...................... | 95/11 |

Primary Examiner—John M. Horan
Assistant Examiner—Fred L. Braun
Attorney—Robert W. Hampton and Ronald S. Kareken ABSTRACT: A photographic flashcube camera having a single member such as the shutter driver to coordinate the film wind with shutter operation and flashcube indexing. In a preferred form, movement of a film-winding lever cocks a shutter driver. The driver, in turn, engages and cocks or energizes a flashcube indexing mechanism. This mechanism then is released, when an exposure is made, to index the flashcube.

WILLIAM H. HORTON
ALLAN M. PALMER
INVENTORS

ATTORNEYS

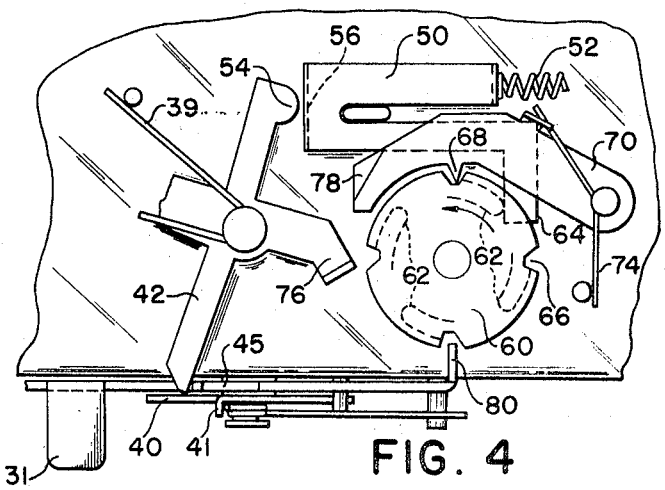
FIG. 4
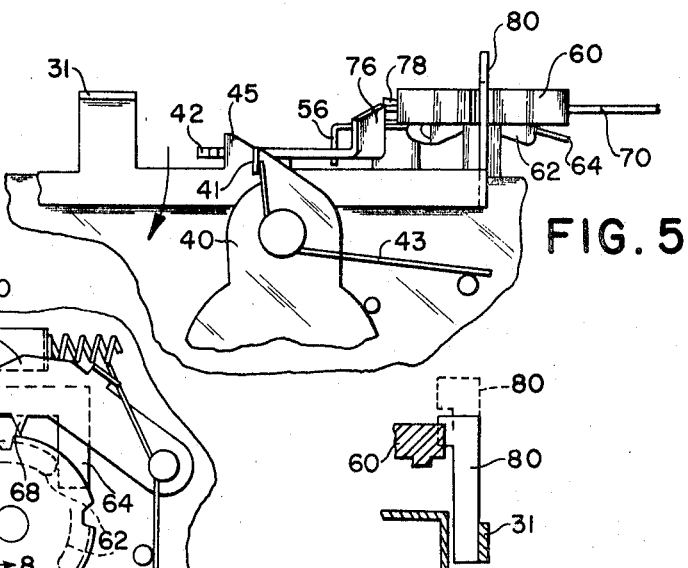
FIG. 5
FIG. 8
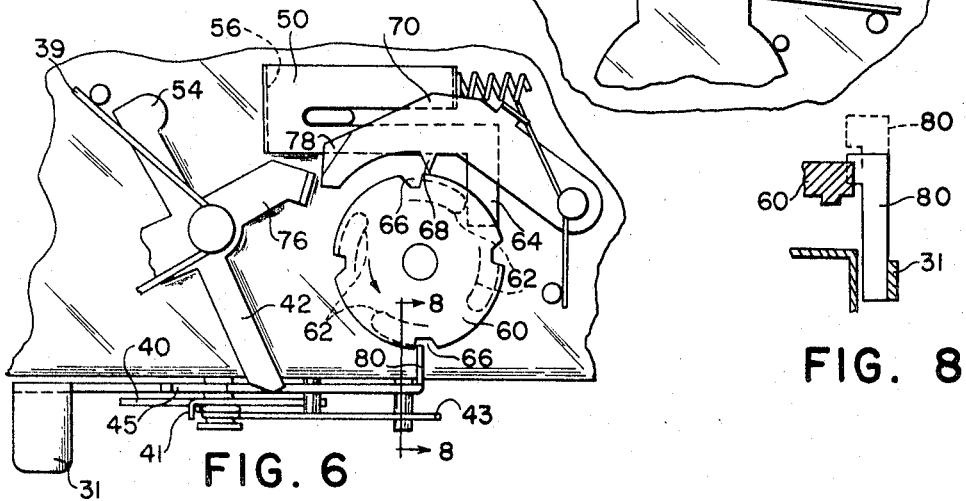
FIG. 6
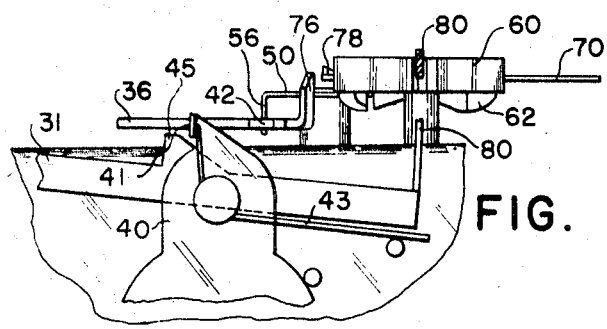
FIG. 7
WILLIAM H. HORTON
ALLAN M. PALMER
*INVENTORS*
BY Ronald S. Vaughan
Robert W. Hampton
ATTORNEYS

FLASH CAMERA

BACKGROUND OF THE INVENTION

FIELD OF THE INVENTION

This invention relates to flash photography, and more particularly, to photographic still cameras with built-in photoflash systems for accepting multilamp photoflash packages such as flashcubes.

DESCRIPTION OF THE PRIOR ART

There has been developed a disposable multilamp photoflash unit or package having a plurality of photoflash lamps and disclosed, for example, in U.S. Pat. No. 3,327,105. Cameras to receive such packages, commonly known as flashcubes, and mechanisms for automatically indexing a received flashcube to successively place fresh or unfired lamps in a flash firing position also have been developed. In one such camera, disclosed in U.S. Pat. No. 3,353,467, there is provided means for automatically indexing the flashcube by rotating the receiving socket after an exposure by a socket drive spring energized during the camera setting operation for such exposure.

SUMMARY OF THE INVENTION

The present invention comprises an improved flashcube socket drive and camera resetting mechanism that also indexes the flashcube after camera operation. According to the present invention, however, coordination of camera setting, camera operation and flashcube indexing are accomplished through a single member that ensures correct functioning at all times. In the preferred embodiment, this single member comprises a spider-shaped shutter driver.

BRIEF DESCRIPTION OF THE DRAWING

The invention as well as objects and advantages thereof will become more apparent in the course of the following description, the accompanying drawing forming a part thereof and wherein:

FIGS. 4 and 5 are top and front views, respectively, showing the mechanism of FIG. 2 after the camera has been set; and FIGS. 6 through 8 are plan, front and partial end views showing the mechanism of FIG. 2 after camera operation but before trigger release.

DESCRIPTION OF THE PREFERRED EMBODIMENT

Figure 1:
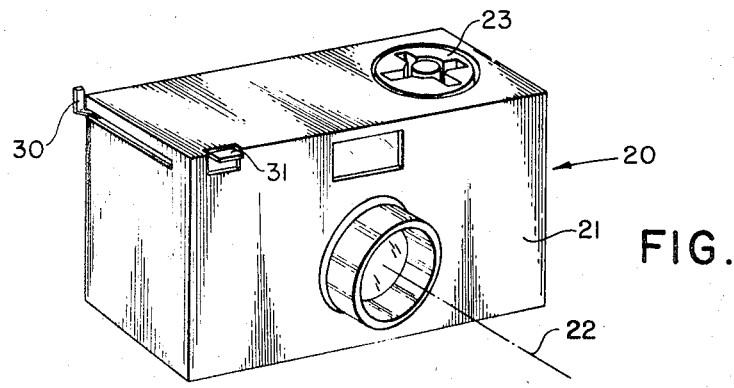
FIG. 1 is a perspective view of a photographic still camera embodying the present invention.

With reference to FIG. 1, there is shown a photographic roll film still camera 20 comprising a light tight camera body 21 having a picture-taking or lens axis 22 about which are located the usual objective focusing lens and film support for holding a roll of photosensitive film (not shown). The shutter cooperating with the present invention and to be described in more detail, is positioned to be in operative relationship with the axis 22 in a manner known, per se. Since photographic cameras are well known in the art, the present invention will be described only in relation to those elements forming part of the invention or in direct cooperation therewith, it being understood that the remaining camera components may be selected from those that are known.

Accessibly located at the top wall of the camera body 21 is a multilamp package receiving socket 23 designed to receive a disposable, multilamp photoflash unit or flashcube. Such a flashcube is more fully described in the above listed U.S. Pat. Briefly, however, the flashcube includes a plurality (four) of photoflash lamps (AG-type) ordinately mounted in a vertical position about a vertical axis of rotation on a substantially square base, each lamp having a portion extending below the base to be selectively engageable with the lamp firing means such as electrical terminals. Individual light reflectors are positioned behind each lamp, and an overall light transmitting protective cover is provided. The base defines four lamp sides and includes a depending center connecting post. The socket 23 defines an opening, corresponding to the shape of the connecting post, for receiving the package in any one of four predetermined positions in which one of the lamps is in position for engagement with the lamp firing means.

FILM WIND AND SHUTTER MECHANISMS

To wind the roll film along the film plane for positioning successive film frames on the film plane, there is provided an accessible film winding lever 30. The lever 30 also sets the camera shutter operating mechanism, which is released by an accessible shutter trigger or body release member 31 to expose the positioned film frame by admitting light to the camera interior along the axis 22 for a predetermined period.

Figure 2:
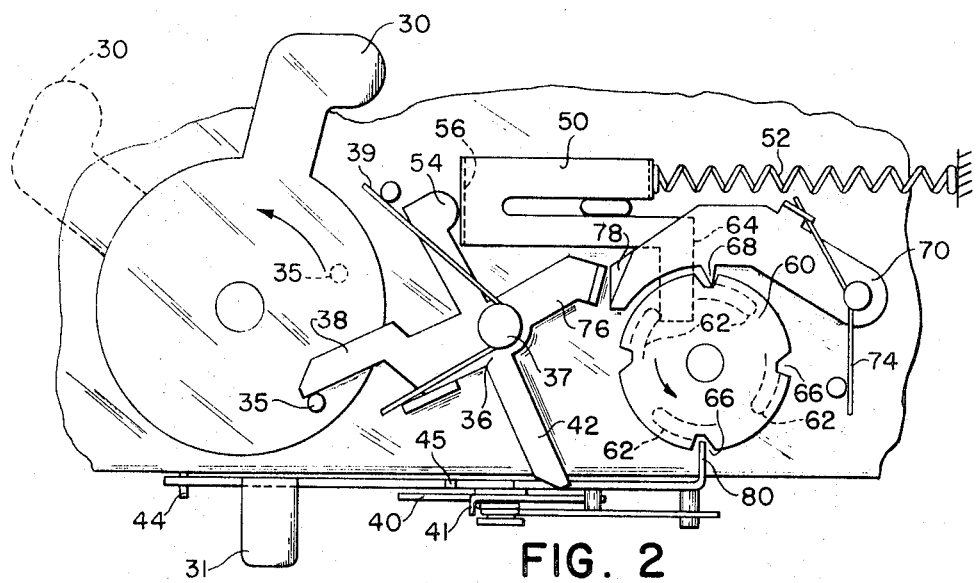
FIG. 2 is a top plan view showing the preferred embodiment of the camera setting and multilamp package indexing mechanism according to the present invention.

Winding lever 30 operates a known film winding mechanism such as a pawl and ratchet assembly or clutch arrangement connecting the lever to a film take up spool. As shown in FIG. 2, the winding lever 30 also includes a shutter cocking pin 35 which acts to set the shutter mechanism as the film is being wound.

Figure 3:
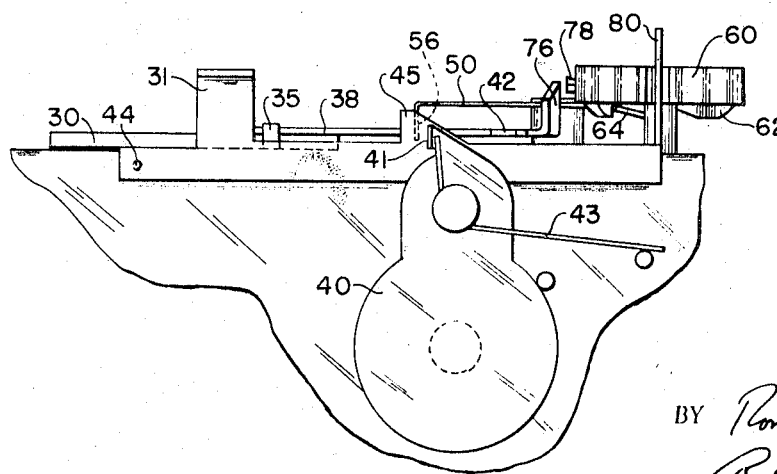
FIG. 3 is a front view of the elements as shown in FIG. 2.

A suitable shutter mechanism according to the present invention comprises a shutter striking plate or driver 36 which rotates about a pivot 37. An arm 38 on the striking plate 36 is engaged by cocking pin 35 whenever the winding lever is operated to move the plate 36 clockwise (looking down) against the bias of a strong spring 39. The shutter itself comprises a pivotable impact shutter blade 40 having an ear 41 in the path of a second arm 42 on driver 36. A lighter spring 43 normally holds the blade 40 in a position covering the exposure aperture, and a latch 45 on the camera trigger 31 is normally in the path of movement of finger 42 to prevent shutter operation until the trigger is depressed. Upon release of the cocked striking plate by depressing the body release 31 to pivot about pin 44 in the direction of the arrow FIGS. 2 and 5) against a retaining spring (not shown), compressed spring 39 causes arm 42 to move to the right FIGS. 3 and 6), striking ear 41 and moving the shutter blade 40 off the exposure aperture against the bias of spring 43 for the predetermined period, the shutter blade 40 returning to cover the aperture by operation of spring 43.

According to the invention, the package-receiving socket 23 (and inserted flashcube) is automatically indexed or repositioned to present a fresh lamp in the operative position after an exposure has been made. In the embodiment shown, a slider 50 biased to the left FIGS. 2 and 4) by a socket drive spring 52. Slider 50 is energized as the shutter is cocked and film is wound, by a third arm 54 on driver 36 engaging a tab 56 on slider 50 and moving slider 50 to the right.

The socket drive mechanism further includes a rotatable disc 60 forming the lower part of the package socket 23. Disc 60 includes a plurality (four) of wedge-shaped ratchet teeth 62 engageable by an arm 64 of slider 50.

As the winding lever 30 is operated by moving it from the position shown in solid to the position shown in dotted lines (FIG. 2), driver arm 54 engages tab 56 and moves slider 50 from an original position shown in FIG. 2 to the energized position shown in FIG. 4. Upon completion of movement, arm 64 engages a wedge-shaped ratchet tooth 62 (which it overrides during this movement). Spring 52 thus tends to move slider 50 to the left and thereby rotate disc 60 and socket 23 counterclockwise.

At the periphery of the disc 60 are defined a plurality (four) of equally spaced control notches 66 engageable by the pawl 68 of a control lever 70 that ensures proper positioning of the socket assembly 23 during indexing. A wire spring 74 urges pawl 68 against the periphery of disc 60 to enter a notch 66 whenever the socket assembly is rotated by the slider 50 to locate a subsequent lamp of the attached package in the operating position.

After camera operation, a fourth arm 76 on the spider-shaped driver 36 engages a tab 78 on lever 70 to release pawl 68 from a notch 66 as shown in FIG. 6. As stated, shutter operation is controlled by a release latch 45 on the body release member 31. Although the striking plate 36 then moves to otherwise permit slide 50 to move by the urging of drive spring 52 and thereby indexing socket 23, a tab 80 on the member 31 engages the opposing notch 66 to prevent rotation. When body release member 31 is released, the tab 80 is withdrawn from the opposing notch 66 as shown in dotted lines in FIG. 8, which permits disc 60 to rotate until pawl 68 enters the subsequent notch 66.

CAMERA OPERATION

To operate the photographic camera according to the preferred embodiment with photoflash from a multilamp package, a multilamp flash unit or flashcube is placed on the socket assembly 23 with a fresh lamp in the operating position.

If a fresh frame of the film is not at the plane on the lens axis 22, the film is advanced by turning the film advance lever 30 to the position shown in dotted lines in FIG. 2, thereby moving an unexposed film frame onto the film plane and setting the shutter by cocking the shutter striking plate 36 through cocking pin 35 on film advance lever 30. Simultaneously, the socket indexing slider 50 is moved to the position shown in FIG. 4 against the bias of drive spring 52, there the slider 50 is held in position by engagement of tab 64 with a notch 66. While the camera is cocked, pawl 68 of control lever 70, which is in a notch 66 of the socket disc 60, prevents the socket assembly 23 and inserted flashcube from rotating.

At this point, the winding lever 30 is permitted to return to its initial position by a return spring (not shown), and the camera is ready for operation with augmenting flash.

This is accomplished by aiming the camera in the desired direction and depressing the body release member 31 in the direction of the arrow shown in FIG. 5 to its fully depressed position (FIG. 7). This motion initially releases the arm 42 of the cocked striking plate 36, which rapidly strikes shutter ear 45 to cause the shutter blade 40 to uncap the diaphragm aperture for the predetermined time. Simultaneously, arm 42 may operate a flash synchronizer to fire the lamp in the operative position in timed relationship with the uncapping of the exposure aperture to take the "flash picture."

As the body release member 31 is being depressed but before arm 42 is released by latch 45, extension tab 80 moves into engagement with the forward notch 66 of the socket assembly disc 60. After the release member 31 has been fully depressed, the striking plate 36 has moved from its cocked position to its released position. During the movement, arm 76 engages control lever 70 to release pawl 68 from engagement with notch 66, as shown in FIG. 6, but disc 60 is held in position by the tab 80.

After the "flash picture" has been taken, the body release member 31 is released by the operator to return to its original position. Tab 80 thereby is moved out of the forward notch 66, releasing disc 60 and permitting slider 50 to rotate socket assembly 23 in the counterclockwise direction as shown. As the socket assembly 23 (and inserted package) is rotating to move the next flash lamp into the flash position, the next succeeding notch 66 is engaged by pawl 68 on lever 70 to terminate rotation after a quarter turn.

By controlling all operations through a spider-shaped shutter driver having four arms, the invention ensures that the socket assembly will always operate in correct relation with the remaining camera operating mechanisms while maintaining the advantage of having a preset socket position prior to exposure, whether or not the camera has been set.

The invention has been described in detail with particular reference to a preferred embodiment thereof, but it will be understood that variations and modifications can be effected within the spirit and scope of the invention as described hereinabove and as defined in the appended claims.

We claim:

1. In a camera having a film-winding mechanism, a shutter operative to expose film receivable in the camera, an indexable socket for receiving a multiple-lamp flash device having a plurality of ignitable lamps, and a lamp igniting mechanism, the improvement comprising:

drive means for indexing the socket, said drive means being movable from a first position to a second position to energize the drive means and from the second position to the first position to index the socket; and a shutter driver movable between a set position and a released position for operating the shutter, said shutter driver including a member engageable with the drive means in the first position for moving the drive means to the second position and for energizing the drive means in response to movement of the shutter driver to the set position, said member being disengageable from the drive means in the second position upon movement of the shutter driver to the released position to permit indexing of the socket by movement of the energized drive means to the first position.

2. In a camera having a film-winding mechanism, a movable socket for receiving a multiple-lamp flash device having a plurality of ignitable lamps; and a lamp firing mechanism, the improvement comprising; drive means for moving the socket to sequentially place one of the lamps of a received multiple lamp device in a position for ignition by the lamp firing mechanism, said drive means being movable from a first position to a second position to energize the drive means and from the second position to the first position to move the socket, and a shutter driver movable between a set position and a released position, the shutter driver including first means engageable by the film-winding mechanism for moving the shutter driver to the set position in response to film wind, and second means substantially rigid relative to said shutter driver for engaging the drive means and for moving the drive means to the second position in response to movement of the shutter driver to the set position.

3. The improvement according to claim 2, and further comprising latch means engageable with the socket to selectively retain the socket against movement when the drive means is moved to its second position, and wherein the shutter driver further comprises a member for disengaging the latch means responsive to movement of the shutter driver from the set position to the released position.

4. The improvement according to claim 3, wherein the socket comprises means defining a plurality of notches, and the latch means comprises a pawl engageable with a selected one of the notches.

5. The improvement according to claim 4, and further comprising a movable camera operating member to release the shutter driver when pressed and having a latch member selectively engageable with a notch to retain the socket against movement, while the operating member is pressed.

6. The improvement according to claim 3, wherein the shutter driver comprises a spider member having four arms each of which is at substantially right angles to the adjacent arm, and wherein the four arms respectively comprise the first means, the second means, the member responsive to movement of the shutter driver and a second member engageable with the shutter to operate the shutter in response to movement of the shutter driver from the set position to the release position.

7. The improvement according to claim 2, wherein the socket comprises a plurality of ratchet teeth, and the drive means comprises a slider having an arm selectively engageable with the teeth to move the socket with movement of the slider from the second position to the first position.